3,193,503
MAGNETIC CERAMIC FERRITES AND
METHOD FOR MAKING SAME
William E. Smith, Sylvania, Ohio, assignor to Owens-
Illinois Glass Company, a corporation of Ohio
No Drawing. Filed Dec. 31, 1962, Ser. No. 248,221
20 Claims. (Cl. 252—62.5)

This invention relates to ceramic ferrites and to a process for making the same and, more particularly, to a magnetic ceramic ferrites having desired electrical and magnetic properties, and a process whereby the desired properties can be reproduced in subsequent ferrites formed in accordance with the invention.

While magnetic ferrite materials are commercially available for use as components in making electrical and electronic circuits including transformers, inductors, switching elements, microwave circuits, and other high-frequency apparatus, the processes by which such ferrites are made are usually complex and time-consuming, resulting in a proportionately high cost for the individual ferrites. A principal disadvantage with such processes is the difficulty encountered in attempting to exactly reproduce ferrites having specified properties, thus leading to the production and subsequent discarding of ferrite material which does not meet the requirements of the purchaser. Ferrites having the desired magnetic and electrical properties at microwave frequencies are difficult to reproduce due in part to the high shrinkage and the unpredictability of the final density, grain size, and structure, all of which affect other physical properties of the ceramic products and, in turn, affect the electrical and magnetic properties as well.

Accordingly, it is an object of the present invention to obviate the disadvantages which exist in the known processes for producing magnetic ceramic ferrites.

It is another object of the present invention to provide a process for the manufacture of magnetic ceramic ferrites having consistently high mechanical strength and excellent electrical and magnetic properties.

It is a further object of this invention to provide a method of readily and economically forming highly magnetic ceramic ferrites and, more importantly, of being able to continually reproduce ferrites having the desired electrical and magnetic properties.

It is still another object of this invention to provide magnetic ceramic ferrites having the requisite electrical and magnetic properties and which can be readily formed in any desired configuration.

Another object of this invention is to provide a magnetic ceramic ferrite body having excellent, high magnetic properties and useful in a large number of systems wherein magnetic ferrites are now employed.

In attaining these objects, one feature of the invention resides in forming the magnetic ceramic ferrite from a magnesia-iron oxide-silica composition.

Another feature of the invention resides in melting the ingredients in the proper porportions and casting or otherwise forming the vitreous melt into the desired shape, and crystallizing the shaped mass by heat treatment to produce a highly magnetic ceramic body having a substantially uniform crystalline structure.

Other objects, features, and advantages of this invention will become apparent from the following description.

It has now been found that a composition, at least 85 weight percent of which consists essentially of, by weight, from 16 to 50 percent MgO, 37 to 60 percent iron oxide expressed as $Fe_3O_4$, and from 20 to 45 percent $SiO_2$, when subjected to heating in an oxidizing atmosphere at a temperature sufficient to melt the batch to a homogeneous vitreous melt, and thereafter further heat treated at a temperature below the liquidus of the melt, whereby devitrification is initiated and fostered until the composition becomes essentially a crystalline structure, has highly magnetic properties and is extremely suitable for use as a magnetic ceramic ferrite. The fine-grained crystalline structure consists essentially of a multiplicity of inorganic crystals dispersed in a glassy matrix, the structure preferably being at least 50 volume percent crystalline material.

While excellent crystallized magnetic ferrites have been formed from a melt of a vitreous composition consisting of the three basic components, magnesium oxide, iron oxide and silica, a better control over the crystallization process is obtained when one or more nucleation catalysts such as $TiO_2$, $ZrO_2$ or $SnO_2$ and the like are present. Furthermore, the presence of mineralizers or fluxes such as $CaF_2$, $Li_2O$ and LiF and the like do not affect the basic magnetic properties of the structures formed in accordance with the invention. However, the composition of the invention is at least 85 weight percent, preferably about 90 weight percent to 100 weight percent, magnesium oxide plus silica plus oxide, expressed as $Fe_3O_4$.

The vitreous melts of the invention can be crystallized in a number of ways. In one method the melts are simply slowly cooled after being cast, pressed, or otherwise formed into the desired shape. During the cooling partial crystallization takes place and the semi-crystalline product contains over 50 volume percent crystalline material in a glassy matrix. Such products can be reheated to obtain further crystallization, if desired, it being necessary to accomplish the reheating at a temperature between the annealing point of a vitreous glass of a composition of the original melt and its liquidus. On the other hand the compositions can be quickly quenched to form a glass and then the divitrification or crystallization effected by heating to form a semi-crystalline product containing over 50 volume percent crystalline material. Also, any of the products formed by the aforedescribed methods can be comminuted and then pressed into a desired coherent shape. Thereafter, the compressed shape can be sintered to form a stronger composite body and to effect further crystallization, if such crystallization has not already been substantially completed. Thus, the compressed shapes can be formed from either particulate glass or particulate semicrystalline material.

As stated, the compositions of the melts from which the products of the invention are made can contain up to 15 weight percent, preferably not more than 10 percent, of compatible inorganic ingredients other than the aforementioned magnesium oxide, iron oxide and silica. For instance, zirconia can be employed in amounts up to about 10 weight percent; titania can be employed in amounts up to about 10 weight percent; alkali metal oxides, specifically, sodium, potassium and lithium oxides, can be employed in amounts up to as much as 10 weight percent, but preferably no more than 5 weight percent; alkali metal fluorides can be employed in amounts up to 5 weight percent, and tin oxide, expressed as $SnO_2$, can be present in amounts up to about 10 weight percent.

Higher amounts of additives to the composition tend to dilute the desired ferrite compounds undesirably. Specifically, higher amounts of alkali metal oxides tend to undesirably minimize the proportion of ferrite crystals obtainable by retarding crystallization. Mineralizers and nucleation catalysts mentioned could be used in amounts over 10 weight percent but such higher amounts are not necessary and do not add to the desired properties. Other mineralizers or nucleation catalysts which can be present in small amounts include $CaF_2$, $CoO$, $NiO$, $V_2O_5$, $MoO_3$, and $ThO_2$. The amount of these agents ordinarily does not exceed 5 weight percent.

The silica does not enter into the crystalline structure of the magnetic ferrite crystals, it is believed, but the presence of silica is beneficial in lowering the melting temperature, in controlling the devitrification so that parts can be properly formed before devitrification is too advanced, and in providing the main basis for the glassy matrix of the crystalline ferrite products of the invention. The presence of the glassy matrix increases the strength of the products compared to prior art iron or magnesium ferrites made by conventional sintering reactions.

The present products are made by melting a batch, as before described, from conventional raw materials at a high enough temperature to form a homogeneous, vitreous melt, the melting being carried out in an oxidizing, oxygen-containing atmosphere, such as an air atmosphere, an oxygen-enriched air atmosphere, or an oxygen atmosphere. Thereafter the melt is shaped and cooled and further treated by the procedures before described to form the partly crystalline ceramic ferrite product.

A number of devitrified magnesia-iron oxide-silica ferrites were made from vitreous compositions prepared from the following ingredients, all parts being by weight.

TABLE I

| Ingredients | A | B | C | D | E | F | G |
| --- | --- | --- | --- | --- | --- | --- | --- |
| Flint | 90.0 | 67.5 | 69.0 | 81.0 | 81.0 | 121.5 | 121.5 |
| Ferric Oxide | 156.0 | 140.4 | 140.4 | 140.4 | 140.4 | 210.6 | 210.6 |
| Periclase MgO | 62.2 | 56.0 | 56.0 | 56.0 | 56.0 | 84.0 | 84.0 |
| Lithium Carbonate | | | 7.4 | 14.8 | 7.4 | 14.8 | | |
| Zircon | | | 40.5 | 36.0 | | | | |
| Titanium Dioxide | | | | | 27.0 | 24.0 | | |
| Stannic Oxide | | | | | | | 40.5 | 45.0 |
| Lithium Fluoride | | | | | | | 4.5 | |

The following compositions formed glasses of the compositions shown in Table II. Iron oxide is expressed as $Fe_3O_4$.

TABLE II

| | | | | | | | |
| --- | --- | --- | --- | --- | --- | --- | --- |
| $SiO_2$ | 30 | 27 | 27 | 27 | 27 | 27 | 27 |
| $Fe_3O_4$ | 50 | 45 | 45 | 45 | 45 | 45 | 45 |
| MgO | 20 | 18 | 18 | 18 | 18 | 18 | 18 |
| $Li_2O$ | | 1 | 2 | 1 | 2 | | |
| $ZrO_2$ | | 9 | 8 | | | | |
| $TiO_2$ | | | | 9 | 8 | | |
| $SnO_2$ | | | | | | 9 | 10 |
| LiF | | | | | | 1 | |

Devitrified ceramic ferrites formed from each of the above compositions, and also from other compositions of the aforesaid magnesia-iron oxide-silica system exhibited excellent electrical and magnetic properties making them extremely useful for all purposes wherein commercial magnetic ferrites have heretofore been used.

Each of the compositions set forth in Table I was thoroughly mixed in a platinum crucible, placed in an electric furnace having an air atmosphere producing oxidizing conditions and maintained at a temperature of 2800° F. until the composition was molten and homogeneous. Each vitreous melt was stirred and poured into a mold and slowly cooled to form a semi-crystalline body having a length of one inch and a diameter of ⅛ of an inch. The vitreous bodies were then devitrified by subjecting them to a temperature (1700° F) above the annealing temperature of the oriignal glass for a period of two hours, and crystallization of the cast bodies occurred to form semi-crystalline magnetic ceramics containing well over 50 volume percent crystalline material dispersed in a glassy matrix.

The contact electrical resistance of the solid bodies made from the above compositions was high, ranging from 1000 to 10,000 ohms. However, the bulk specific resistivity was lower, measuring 600 ohm-cm. at room temperature. The solid bodies cast by the above process and then crystallized exhibited high magnetic susceptibility and very low D.C. electrical resistance.

When the cast bodies of compositions A to G inclusive were separately crushed to a fineness of —100 mesh size and the particles of each composition were cold pressed into separate bodies of the original composition and substantially the original size and then sintered at 1700° F. until rigid, the resulting sintered bodies exhibited the same high magnetic susceptibility as for the solid cast bodies. However, the sintered products showed a very high D.C. resistance. Since eddy current losses increase with an increase in frequency, the sintered ceramic cores are preferred when high frequencies are to be encountered, as such cores reduce the eddy current losses. For lower frequencies, solid ceramic ferrite cores may be used.

The magnetic properties of the ceramic ferrites made in accordance with the invention were tested in the manner described below.

*Example 1*

A crystalline ferrite slug measuring ⅛" in diameter and 1" in length was prepared from composition B in the manner indicated above. The ferrite was then crushed to —100 mesh size and the granules compacted into the original shape of the slug. The ferrite slug was then fully inserted into the coil of a tuned circuit which had been tuned by means of a variable capacitor to resonate at a frequency of 5 megacycles. The presence of the ferrite of the invention lowered the resonant frequency of the coil by 50 kilocycles with no apparent loss in Q as measured with a Q-meter. As is known, Q is the value of the reactance of the coil at the resonant frequency divided by the resistance in the circuit.

*Example 2*

Three solid magnetic ceramic ferrites were made from the composition B in accordance with the process described above, except that the ferrites varied in size, being progressively larger in diameter and length. Each ferrite in turn was fully inserted within the coil of the tuned circuit described in Example 1 and which was first tuned to resonate at a frequency of 5 megacycles. The ferrites changed the resonant frequency of the coil by about 100 kilocycles, 150 kilocycles, and 250 kilocycles, respectively, with the change in the frequency increasing with an increase in the size of the ferrite. The increase in the Q of the circuit was equivalent to that produced by a commercially available $Fe_2O_3$-MgO-MnO ferrite core made by a solid-state reaction process.

Ferrite cores made from each of the above compositions were similiarly tested and produced substantially the same results as set forth above in Examples 1 and 2. While cold-pressed ceramic particles of —100 mesh size gave good results, the size of the particles can vary to a larger or smaller size of from about — 200 to +200 mesh size or more.

By making ferrites in accordance with the disclosed invention, the electrical and magnetic properties can readily be reproduced, since the vitreous composition can be carefully controlled, melted, cast and devitrified to produce consistently uniform products. There is good predictability as to the final density, grain size and structure and, of course, no shrinkage of the ferrite during manufacture as has occurred in known commercial operations where it has been difficult to continuously reproduce ferrites having identical properties.

Magnetic ceramic ferrites of the present invention are useful as cores for induction coils, as elements in electronic circuits, including microwave circuits, as elements in antenna systems, as microwave switches, and a large number of electrical and electronic equipment where a wide range of radio wave frequencies are encountered. Ceramic ferrites of the present invention are also useful as transformer cores even though such a core could not have as high a susceptibility as iron. The resistance of the ceramic core, however, would be such that it would considerably decrease eddy current losses. Other uses for the ceramic ferrites of the present invention will be apparent from the foregoing disclosure.

It will be evident that modifications of this invention can be made without departing from the spirit and scope of this disclosure or the scope of the following claims.

I claim:

1. A method of manufacturing magnetic ceramic ferrites comprising the steps of forming a homogeneous melt in an oxidizing atmosphere, said melt containing 85–100 weight percent of a composition consisting of 16 to 50 percent MgO, 37 to 60 percent iron oxide expressed as $Fe_3O_4$, and 20 to 45 percent $SiO_2$, cooling the composition and subjecting the cooled homogeneous melt to a temperature sufficient to initiate and foster devitrification of the cooled melt to form a semicrystalline magnetic ceramic body, the remaining 15–0 weight percent of said melt being other compatible members selected from the group consisting of inorganic oxides and fluorides and mixtures thereof.

2. The process of claim 1 wherein said crystalline ceramic body is ground into fine particles and said particles are compacted under pressure to form a shaped body of magnetic crystalline ceramic particles.

3. The process as defined in claim 2 wherein said compacted particles are subjected to sintering temperature for a period of time sufficient to form a hard, sintered body of the magnetic crystalline ceramic.

4. A method of manufacturing magnetic ceramic ferrites comprising the steps of forming a homogeneous melt in an oxidizing atmosphere, said melt containing 90–100 weight percent of a composition consisting of 16 to 50 percent MgO, 37 to 60 percent iron oxide expressed as $Fe_3O_4$, and 20 to 45 percent $SiO_2$, cooling the composition and subjecting the cooled homogeneous melt to a temperature sufficient to initiate and foster devitrification of the cooled melt to form a semicrystalline magnetic ceramic body, the remaining 10–0 weight percent of said melt being other compatible members selected from the group consisting of inorganic oxides and fluorides and mixtures thereof.

5. A method of claim 4 wherein the melt contains ingredients other than magnesia, iron oxide and silica in a total amount of up to 10 weight percent, said other ingredients being selected from the group consisting of the following:

| | Weight percent |
|---|---|
| $TiO_2$ | Up to 10. |
| $SnO_2$ | Up to 10. |
| $ZrO_2$ | Up to 10. |
| $Na_2O$ | Up to 5. |
| $K_2O$ | Up to 5. |
| $Li_2O$ | Up to 5. |
| LiF | Up to 5. |
| CoO | Up to 5. |
| NiO | Up to 5. |
| $V_2O_5$ | Up to 5. |
| $MoO_3$ | Up to 5. |
| $ThO_2$ | Up to 5. |
| $CaF_2$ | Up to 5. |

6. A method of manufacturing magnetic ceramic ferrites comprising the steps of forming a homogeneous melt in an oxidizing atmosphere, said melt containing 85–100 percent of a composition consisting of 16 to 50 percent MgO, 37 to 60 percent iron oxide expressed as $Fe_3O_4$, and 20 to 45 percent $SiO_2$, cooling the composition at a rate sufficient to initiate and foster devitrification of the composition to form a semicrystalline magnetic ceramic body containing at least 50 volume percent crystalline material in a glassy matrix, the remaining 15 to 0 weight percent of said composition being other compatible members selected from the group consisting of inorganic oxides and fluorides and mixtures thereof.

7. The method as defined in claim 6 wherein said semicrystalline magnetic ceramic body is reheated to a temperature sufficient to foster further devitrification.

8. A solid magnetic ceramic ferrite body consisting essentially of a devitrified mass of the formulation, by weight, of 85–100 percent of a composition consisting of 16 to 50 percent MgO, 37 to 60 percent iron oxide expressed as $Fe_3O_4$ and 20 to 45 percent $SiO_2$, the remaining 15 to 0 percent of said composition being other compatible members selected from the group consisting of inorganic oxides and fluorides and mixtures thereof, the crystalline material formed by said devitrification constituting at least 50 volume percent of said mass and being dispersed in a residual glassy matrix.

9. A solid magnetic ceramic ferrite body consisting essentially of a devitrified composition of the formulation, by weight, of 16 to 50 percent MgO, 37 to 60 percent iron oxide expressed as $Fe_3O_4$ and 20 to 45 percent $SiO_2$, the crystalline material formed by said devitrification being dispersed in a glassy matrix.

10. A magnetic ceramic ferrite consisting essentially of a sintered shaped mass of finely divided particles of a semicrystalline ceramic composition of the formulation, by weight, of 16 to 50 percent MgO, 37 to 60 percent iron oxide expressed as $Fe_3O_4$ and 20 to 45 percent $SiO_2$.

11. A solid magnetic ceramic ferrite body consisting essentially of a devitrified composition of the formulation, by weight, of 3 parts MgO, 5 parts iron oxide expressed as $Fe_3O_4$ and 2 parts $SiO_2$.

12. A solid magnetic ceramic ferrite body consisting essentially of adhering, finely divided particles of a devitrified composition of the formulation, by weight, of 3 parts MgO, 5 parts iron oxide expressed as $Fe_3O_4$ and 2 parts $SiO_2$.

13. A homogeneous crystallizable solid composition, 85 to 100 percent of which consists of, by weight, 16 to 50 percent MgO, 37 to 60 percent iron oxide expressed as $Fe_3O_4$, and 20 to 45 percent $SiO_2$, the remaining 15 to 0 weight percent of said composition being other compatible members selected from the group consisting of inorganic oxides and fluorides and mixtures thereof.

14. A homogeneous crystallizable solid composition consisting essentially of, by weight, 27 percent $SiO_2$, 45 percent $Fe_3O_4$, 18 percent MgO, 1 percent $Li_2O$ and 9 percent $ZrO_2$.

15. A homogeneous crystallizable solid composition consisting essentially of, by weight, 27 percent $SiO_2$, 45 percent $Fe_3O_4$, 18 percent MgO, 2 percent $Li_2O$ and 8 percent $ZrO_2$.

16. A homogeneous crystallizable solid composition consisting essentially of, by weight, 27 percent $SiO_2$, 45 percent $Fe_3O_4$, 18 percent MgO, 1 percent $Li_2O$ and 9 percent $TiO_2$.

17. A homogeneous crystallizable solid composition consisting essentially of, by weight, 27 percent $SiO_2$, 45 percent $Fe_3O_4$, 18 percent MgO, 2 percent $Li_2O$ and 8 percent $TiO_2$.

18. A homogeneous crystallizable solid composition consisting essentially of, by weight, 27 percent $SiO_2$, 45 percent $Fe_3O_4$, 18 percent MgO, 9 percent $SnO_2$ and 1 percent LiF.

19. A homogeneous crystallizable solid composition consisting essentially of, by weight, 27 percent $SiO_2$, 45 percent $Fe_3O_4$, 18 percent MgO and 10 percent $SnO_2$.

20. A shaped, cold-pressed magnetic ceramic ferrite body consisting essentially of adhering finely divided particles of a devitrified composition of the formulation by weight, of 16 to 50 percent MgO, 37 to 60 percent iron oxide expressed as $Fe_3O_4$ and 20 to 45 percent $SiO_2$.

References Cited by the Examiner

UNITED STATES PATENTS

| | | | |
|---|---|---|---|
| 2,920,971 | 1/60 | Stookey | 106—52 |
| 2,934,667 | 4/60 | Pincus | 252—62.5 |

TOBIAS E. LEVOW, *Primary Examiner.*

MAURICE A. BRINDISI, *Examiner.*